(No Model.) 2 Sheets—Sheet 1.
C. E. FLEMING.
COMBINED BROILER, COFFEE ROASTER, AND WAFFLE IRON.
No. 534,255. Patented Feb. 19, 1895.
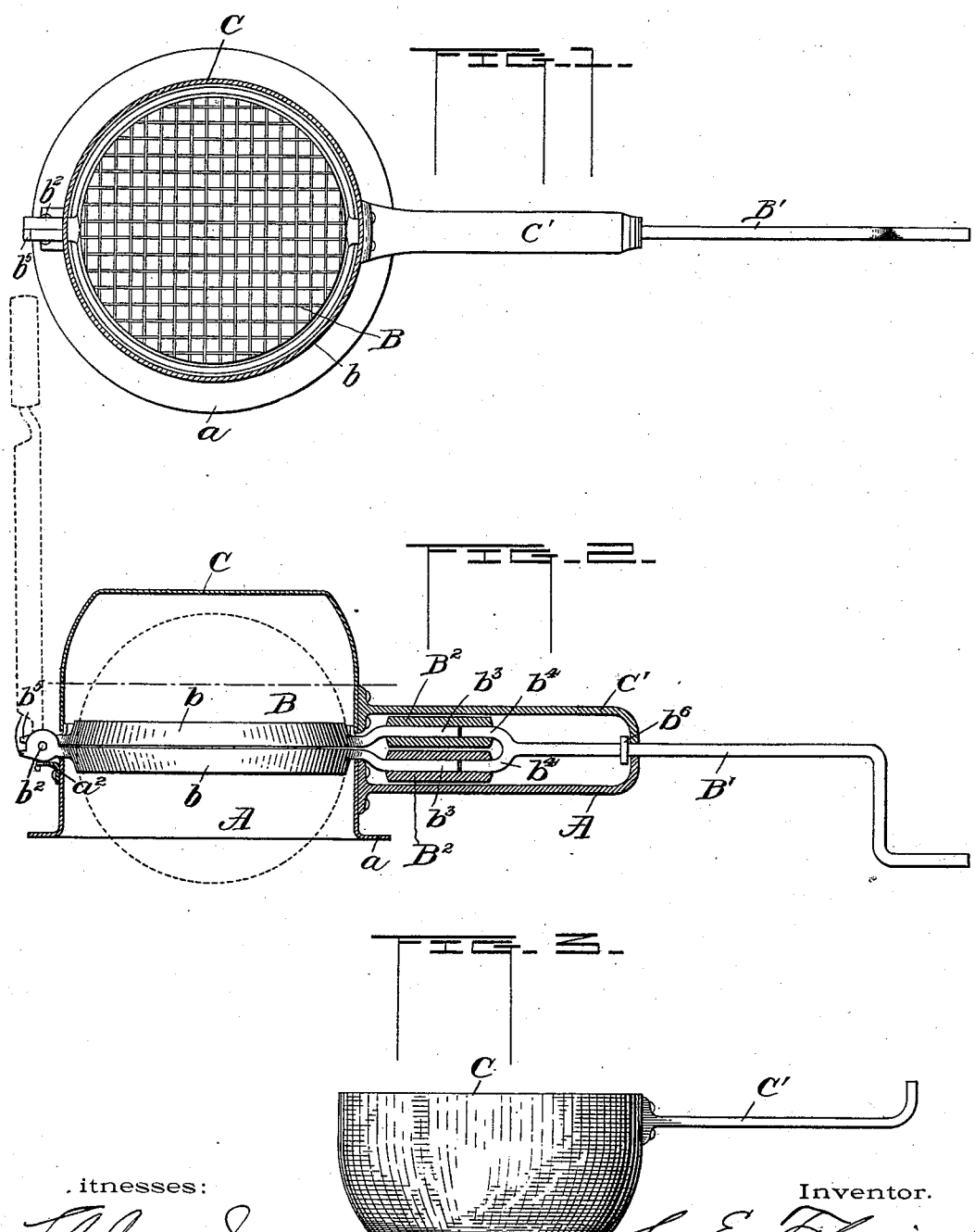
Witnesses:
Inventor.
C. E. Fleming
By Butterworth and Dowell
his Attorneys.

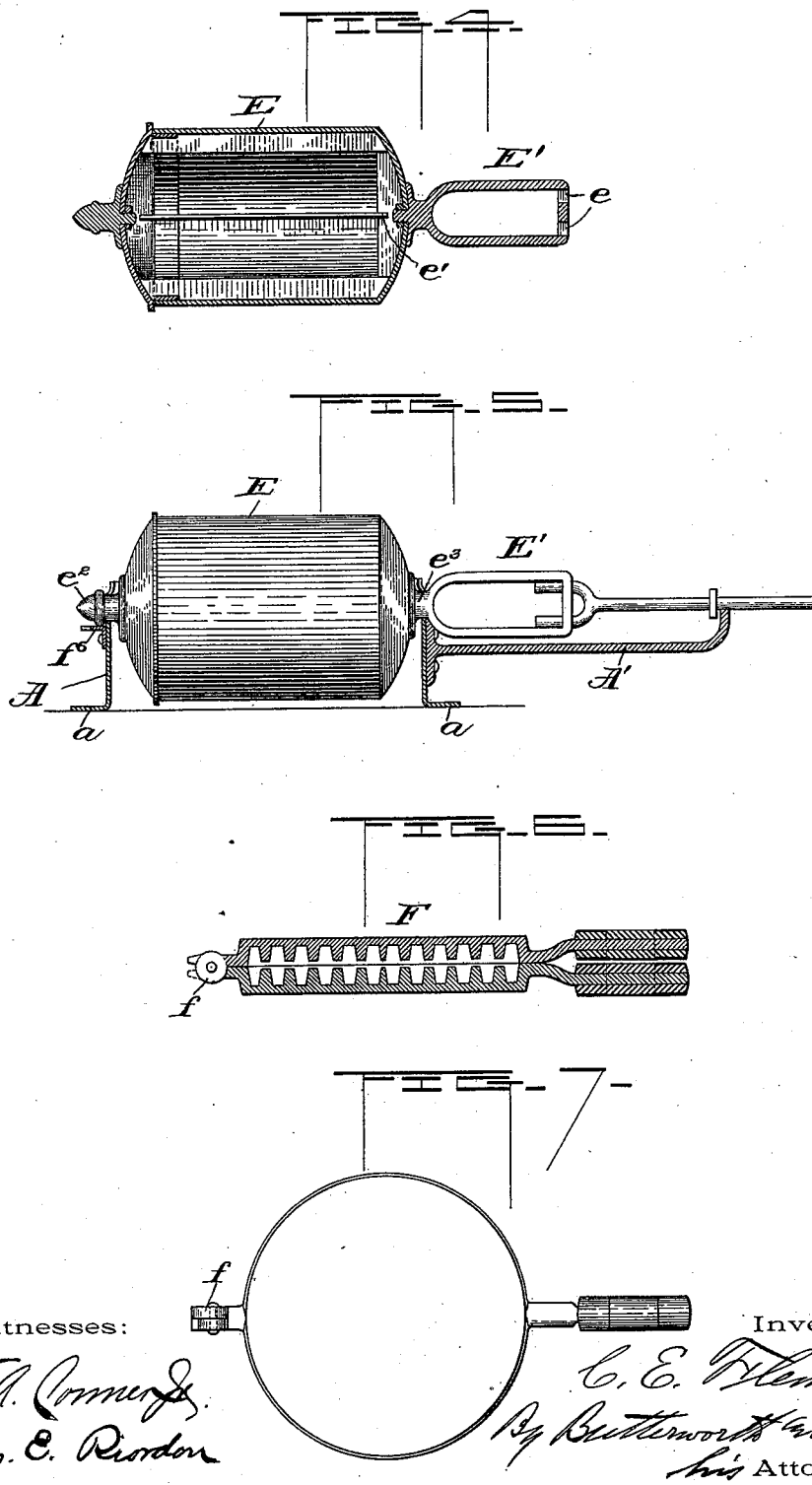

UNITED STATES PATENT OFFICE.

CLARENCE E. FLEMING, OF SARVERSVILLE, PENNSYLVANIA.

COMBINED BROILER, COFFEE-ROASTER, AND WAFFLE-IRON.

SPECIFICATION forming part of Letters Patent No. 534,255, dated February 19, 1895.

Application filed January 30, 1894. Serial No. 498,478. (No model.)

*To all whom it may concern:*

Be it known that I, CLARENCE E. FLEMING, a citizen of the United States, residing at Sarversville, in the county of Butler and State of Pennsylvania, have invented certain new and useful Improvements in a Combined Broiler, Coffee-Roaster, and Waffle-Iron; and I do hereby declare the following to be a full, clear, and exact description of the invention, such as will enable others skilled in the art to which it appertains to make and use the same.

This invention relates to cooking utensils, and the primary object is to produce a convertible implement adapted for broiling meat, roasting coffee, &c., and making waffles; the device being simple in construction, inexpensive in manufacture, and efficient, durable and reliable in use.

Further objects are to provide such utensils with means for rotating the same while in use and while confined within a case or shell; the latter having a removable cover, adapted to confine the heat and at the same time permit convenient access to the contents when desired, so as to retain the juices and flavor of the edible that is being cooked and prevent the escape of smoke into the room. To this end I provide a base or rest with bearings on opposite sides, preferably at the top of the base, and utensils with journals adapted to work in said bearings, together with a dome-shaped cover adapted to fit over the utensil that is being used and rest on the upper edge or top of the base, thus making a tightly fitting case around the utensil, but at the same time permitting the latter to be revolved without removing the cover; the utensil being turned by means of a rod attached to a handle of sufficient length to allow the operator to stand far enough away from the stove not to suffer from the effects of the heat.

In the accompanying drawings, which form a part of this specification, and in which similar letters of reference denote similar parts;—

Figure 1 represents a plan of a broiler constructed in accordance with my invention; the cover being shown in horizontal section. Fig. 2 is a vertical longitudinal sectional elevation of the same; and Fig. 3 is a side view of the removable cover, showing the same inverted for use as a stew or frying pan. Fig. 4, Sheet 2, is a horizontal sectional view of the coffee roaster removed from the base; and Fig. 5 is a side elevation thereof, partly in section. Fig. 6 is a vertical sectional view of the waffle-iron, and Fig. 7 a plan of the same.

In the drawings, A, denotes the base of the utensil which may be cylindrical in form, as shown, and provided with a circumferential base-flange $a$, to adapt it to fit over openings of different sizes; the base being adapted to rest upon the top of the stove with the opening through the latter directly over the opening in the stove.

B, denotes the broiler, which may be constructed in two parts, $b$, $b$, hinged together as at $b^2$, and provided with projecting portions or tangs $b^3$, on which are fitted the handles $B^2$, adapted to connect with a crank-handle $B'$, for rotating the broiler. The projecting portions forming the tangs $b^3$, and hinge $b^2$, adjacent to the body of the utensil are preferably rounded and placed in bearings provided therefor at the top of the base A, so that the utensil may be turned or revolved when desired by the handle $B'$. The handle $B'$, is provided with a bifurcated or forked portion $b^4$, which is adapted to be inserted in the sleeves or handles $B^2$, fitting over the tangs or stems $b^3$, of the broiler-iron, so that when the crank-handle $B'$ is turned the broiler will rotate therewith. The sleeves $B^2$, in which the forked handle and tangs of the broiler-iron are inserted, are preferably composed of wood, or other non-conducting material, so as to provide a handle which may be grasped by the operator without danger of being burned by the heat of the iron.

C, denotes a removable cover which is placed over the broiler-iron B, and provided with a handle $C'$. The base A, is also provided with a handle $A'$, which is opposed to the handle $C'$, and between the extremities of the two a bearing is formed in which the handle $B'$, turns. By forming the broiler-iron of two parts or halves of similar construction hinged together at $b^2$, as stated, the uppermost portion may be raised to the position shown in dotted lines in Fig. 2, when the cover C is removed, and each half of the broiler-iron is provided with a projection or lug $b^5$, adapted to take into a notch or slot in a bracket or lug $a^2$, projecting from the base A, so that when one half of the broiler is raised the other half or horizontal portion will be held against rotation while the broiler is being filled or emptied. It also serves as a stop to prevent further movement of the elevated portion in a backward direction. An enlargement or collar $b^6$, on the rod or handle B' serves as a stop on the inner side of the bearing provided by the handles C', A', to prevent the accidental withdrawal of the outer forked handle when in use.

In Fig. 4 I have shown a coffee roaster (which may also be used for roasting peanuts, pop corn, &c.,) and is adapted to be substituted for the broiler-iron shown in Figs. 1 and 2.

The roaster may consist of an ordinary drum or cylinder E, in which the coffee or whatever is to be roasted is placed, and is adapted to turn on the bearings provided therefor in the base A', the same as described with reference to the broiler. The outer end of the handle E' of the drum or cylinder is perforated as at $e, e$, to receive the fork $b^4$, of the handle B', for turning the cylinder.

When the roaster is in use the cover C, will be placed over it the same as in the case of the broiler, so as to confine the heat. On the inner side of the drum or cylinder E, may be secured metallic strips $e'$, to prevent the coffee, corn, &c., from sliding around while the roaster is rotating, and also to stir and give a tumbling motion to the contents of the vessel. The strips $e'$, may be fastened to the inner walls of the vessel in any proper manner.

A knob $e^2$, projecting from one end of the drum E, forms a journal for that end of the roaster while the opposite journal is formed by the rounded shank $e^3$, of the handle E'.

In Figs. 6 and 7 is shown a waffle-iron F, which in size and shape is substantially the same as the broiler illustrated in Figs. 1 and 2. It is adapted to be used with the same base that is used for the broiler and roaster, but inasmuch as it is only necessary to turn it at intervals and not continuously, as in the case of the broiler and roaster, the turning rod of the handle is not required. The hinge $f$, may therefore be flattened so as to rest on the lug $a^2$, of the base and hold the waffle-iron in a horizontal position while the waffles are baking.

In use, the covered base with the broiler thereon is placed over an open hole in the top of the cook stove so that the surrounding base and cover will confine the heat to the broiler, and at the same time prevent the smoke from escaping into the room. The broiler should be turned continuously so as to bring each side of the meat alternately next to the fire or heat for a moment (not long enough to burn it) and at a rate of speed which neither throws the juices off nor allows them to drop into the fire. In this way meat may be broiled more evenly without risk of burning, as is the case with covered broilers where the cover has to be raised every few moments to turn the meat, and in the latter, for this reason, the escape of heat and smoke is only partially prevented, while in the present case the necessity for removing the cover to turn the meat is avoided.

This same apparatus will also make a splendid bread toaster, because the bread may be turned continuously and the operator is far enough away from the stove not to suffer from the effects of the heat.

The coffee roaster is operated in the same manner as the broiler, and may be used to roast coffee, peanuts, pop-corn, and for various other purposes.

The waffle-iron is also used on the same base that is used with the broiler and coffee roaster, but the turning rod is not necessary in the case of the waffle-iron; it being turned only occasionally by the wooden handles and by hand, and the cover may or not be used therewith. But one base, one cover and one turning rod are used for the whole set.

The cover can be inverted as shown in Fig. 3, and used as a stew or frying pan when not in use as a cover for the utensil mounted upon the base. When used as a stew or frying pan, its bottom being flat and with rounded corners, it will either stand on top of the stove or fit several different sizes of holes.

Having thus fully described my invention, what I claim as new, and desire to secure by Letters Patent of the United States, is—

1. The cylindrical base or rest provided with a circumferential annular base-flange arranged at an angle thereto and with bearings thereon, in combination with a super-imposed removable cover, a cooking utensil journaled in said bearings, a handle or turning device detachably connected with the handle of the utensil for turning the latter without removing the cover and a bearing on the base for the detachable handle, substantially as described.

2. A cooking utensil rotatably supported upon a suitable base and having a handle with sockets or openings in the end thereof, in combination with a detachable handle or turning device having prongs or forks adapted to be inserted in said sockets, substantially as described.

3. In combination with the base or rest, the removable cover provided with a handle having its end turned at an angle to serve as a steadying support when used as a cover, the said cover adapted to be inverted and used as a stew or frying pan, substantially as described.

4. In a cooking utensil a cylindrical base or rest having a handle and an annular base-flange, in combination with a removable cover, also having a handle, a cooking utensil journaled upon said base underneath said cover, and a turning device or handle having a bearing between the handles of said base and cover and detachably connected to said cooking utensil, substantially as described.

5. A cooking utensil comprising a cylindrical base having bearings thereon and provided with a suitable handle, a removable cover for said base having a handle opposed to the handle of the base, a cooking utensil confined within the base and cover and journaled in said bearings, and a handle or turning device removably connected with the handle of the cooking utensil, and having a bearing between the handle of said base and cover, substantially as described.

In testimony whereof I affix my signature in presence of two witnesses.

CLARENCE E. FLEMING.

Witnesses:
GEORGE R. WHITE,
ALEX. MITCHELL.